(12) United States Patent
Gong et al.

(10) Patent No.: US 10,641,400 B2
(45) Date of Patent: May 5, 2020

(54) THREE WAY VALVE

(71) Applicant: BESTTER (XIAMEN) TECHNOLOGY INC., Xiamen (CN)

(72) Inventors: Binhua Gong, Xiamen (CN); Jianbin Zhang, Xiamen (CN); Guoqiang Ye, Xiamen (CN)

(73) Assignee: BESTTER (XIAMEN) TECHNOLOGY INC., Xiamen (CN)

( * ) Notice: Subject to any disclaimer, the term of this patent is extended or adjusted under 35 U.S.C. 154(b) by 0 days.

(21) Appl. No.: 16/056,809

(22) Filed: Aug. 7, 2018

(65) Prior Publication Data
US 2019/0049023 A1 Feb. 14, 2019

(30) Foreign Application Priority Data
Aug. 9, 2017 (CN) ............ 2017 2 0992328 U

(51) Int. Cl.
*F16K 11/074* (2006.01)
*F16K 11/06* (2006.01)

(52) U.S. Cl.
CPC ............ *F16K 11/06* (2013.01); *F16K 11/074* (2013.01)

(58) Field of Classification Search
None
See application file for complete search history.

(56) References Cited

U.S. PATENT DOCUMENTS

| 1,886,677 A * | 11/1932 | Higgins ............... F16K 1/34 251/218 |
| 6,776,189 B1 * | 8/2004 | Wang ............... F16K 11/074 137/625.46 |
| 2006/0207664 A1 * | 9/2006 | Yang ............... E03C 1/023 137/597 |

* cited by examiner

*Primary Examiner* — John Fox
(74) *Attorney, Agent, or Firm* — Cooper Legal Group, LLC

(57) ABSTRACT

The utility model discloses a three way valve, which includes a three way valve body, and the three way valve body is provided with a water inlet channel, partition are provided in the center of the three valve body, and two water outlets are provided on the partition, and two water outlets are connected separately to two water outlet channels; A rotor is arranged above the partition, and the eccentric position of the bottom of the rotor is provided with a sealing leather bowl. When the rotor is rotated, the sealing leather bowl can sequentially seal the two water outlet. The utility model is capable of sequentially sealing the water outlet by the rotating rotor and the leather bowl synchronously rotating with the rotor, and can form two water outlet channels to separately discharge water or simultaneously discharge water.

10 Claims, 4 Drawing Sheets

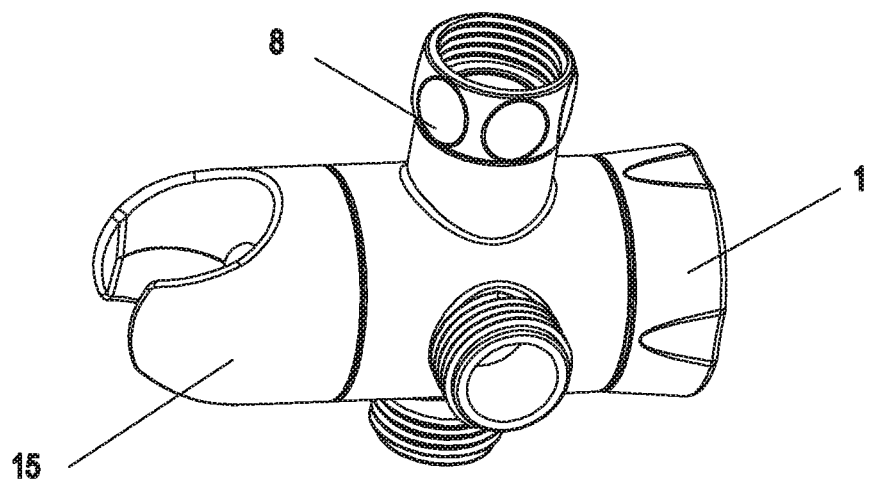
FIG. 3
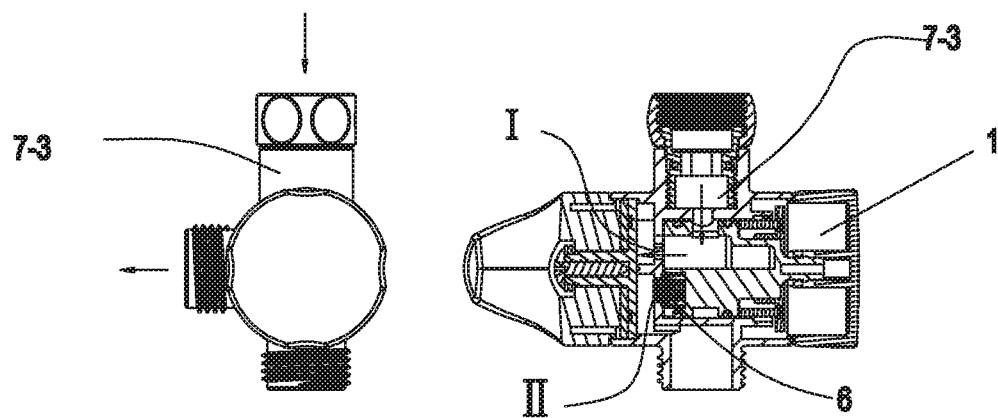
FIG. 4A         FIG. 4B
FIG. 4

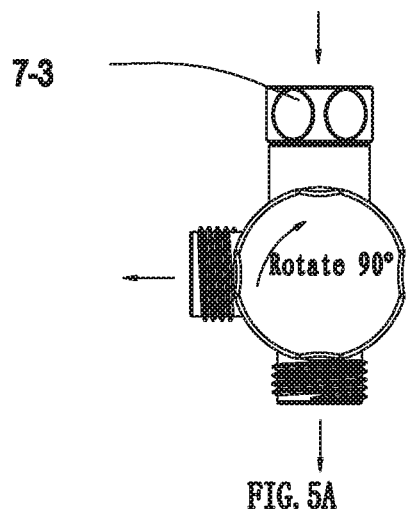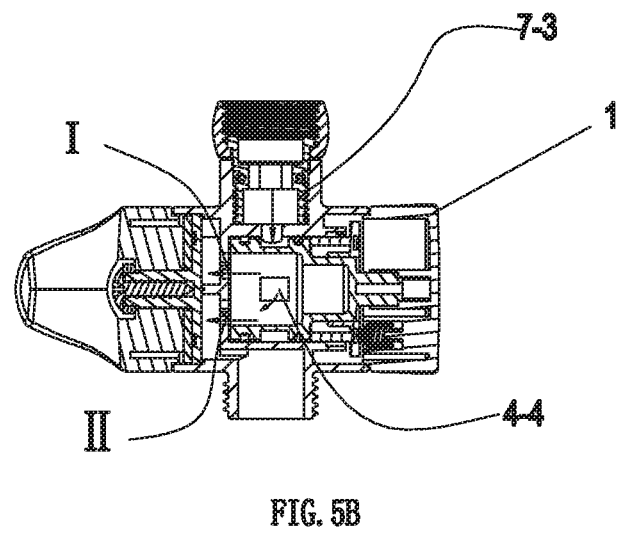
FIG. 5A  FIG. 5B
FIG. 5
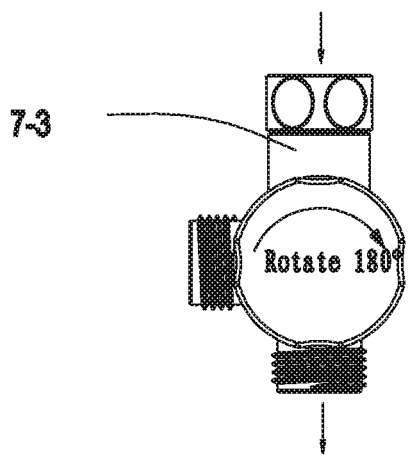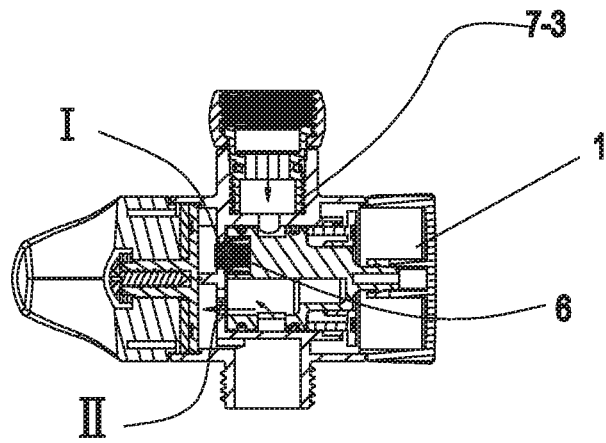
FIG. 6A  FIG. 6B
FIG. 6

THREE WAY VALVE

TECHNICAL FIELD

This utility model involves a three way valve.

BACKGROUND TECHNIQUE

At present, there are various kinds of three way valves on the market, but most of the current three way valve switch waterways by relatively rotating the valve core to the valve body. Its rotation is laborious, or its function is single. It can only switch to turn on one of the channels, and can not connect two channels simultaneously; or it can connect two channels at the same time, but it can not switch channels.

UTILITY MODEL CONTENT

The main purpose of this utility model is to provide a novel three way valve.

The technical solution adopted by the utility model to solve the technical problems is as follows:

A three way valve, wherein:it includes a three way valve body (7), and the three way valve body (7) is provided with a water inlet channel, partition (7-5) are provided in the center of the three valve body (7), and two water outlets are provided on the partition (7-5), and two water outlets are connected separately to two water outlet channels;a rotor (4) is arranged above the partition (7-5), and the eccentric position of the bottom of the rotor (4) is provided with a sealing leather bowl (6). When the rotor is rotated, the sealing leather bowl (6) can sequentially seal the two water outlet.

In an embodiment, the two water outlet of the partition (7-5) is respectively located in the non center position of the partition (7-5).

In an embodiment, the rotor (4) is fixed with a fixing seat (2), and a synchronous movement relationship is formed between the two In an embodiment, a fixing seat (2) is sleeved with a knob (1), and a synchronous motion relationship is formed between them.

In an embodiment, the rotor (4) is hollow, the outer wall is surrounded by a circumferential water passage groove (4-3), and the water passage groove (4-3) is provided with a water passage hole (4-4) connecting the inner and outer walls.

In an embodiment, the bottom eccentric position of the rotor (4) is provided with a leather bowl mounting hole (4-1), and the leather bowl mounting hole (4-1) is provided with a leather bowl spring (5) and a sealing leather bowl (6).

In an embodiment, a first joint (7-1) and a third joint (7-3) are arranged on the opposite sides of the three way valve body (7), and a second joint (7-2) is arranged between the first joint (7-1) and the third joint (7-3).

Compared with the background technology, the technical solution has the following advantages:

1, the utility model is capable of sequentially sealing the water outlet by the rotating rotor and the leather bowl synchronously rotating with the rotor, and can form two water outlet channels to separately discharge water or simultaneously discharge water;

2, the leather bowl is equipped with springs, which are flexible during rotation and are not easy to be damaged.

BRIEF DESCRIPTION OF THE DRAWINGS

This utility model is further explained in conjunction with the accompanying drawings and embodiments.

FIG. 3 a schematic diagram of the assembly structure of this utility model.

FIG. 4 is the first of the state of water flow, where FIG. 4A and FIG. 4B are at different angles, and the arrow indicates the direction of water flow.

FIG. 5 is the second of the state of water flow, where FIG. 5A and FIG. 5B are at different angles, the arrow indicates the direction of the water flow.

FIG. 6 is the third of the state of the water flow, where FIG. 6A and FIG. 6B are at different angles. The arrow indicates the direction of the water flow.

1-knob 2-fixing seat 3-sealing ring 4-rotor 5-leather bowl spring 6-sealing leather bowl 7-three way valve body 8-hexagon nut 9-threaded joint 10-sealing ring 11-screw column 12-friction pad 13-positioning pin 14-positioning spring 15-spray seat 16-hexagonal gasket 17-screw

DETAILED DESCRIPTION

Figure 1:
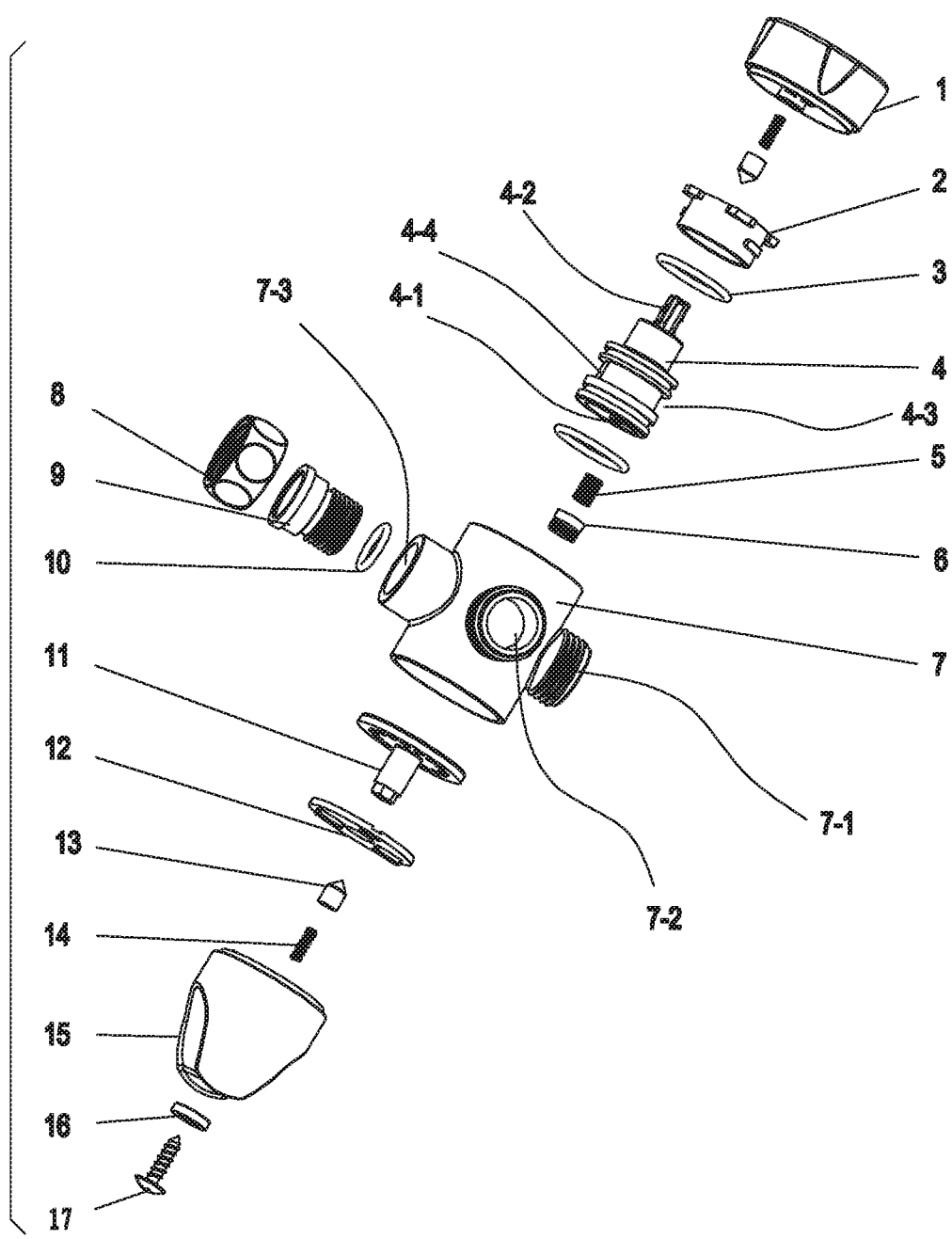
FIG. 1 is one of the schematic diagrams of the explosive structure of this utility model.
Figure 2:
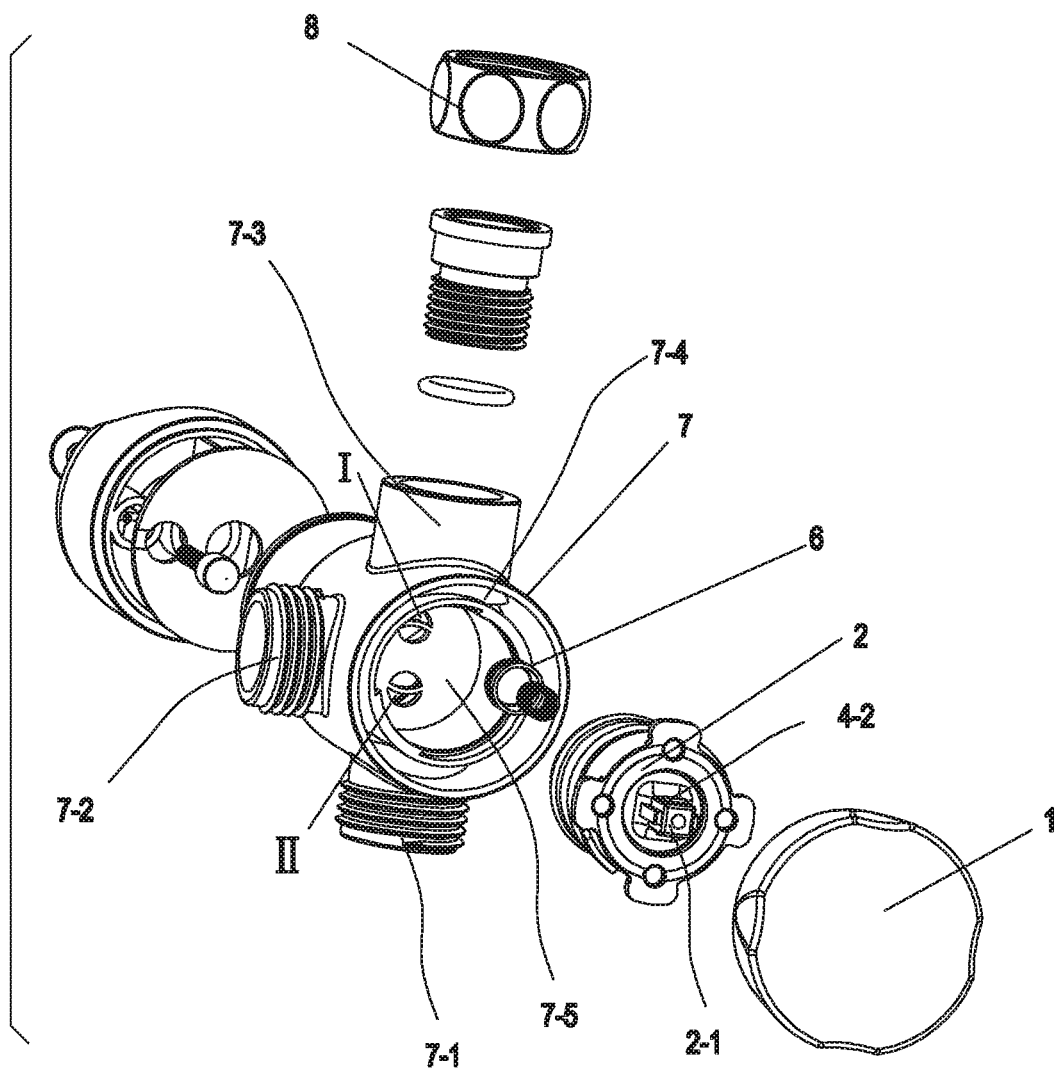
FIG. 2 is another of the schematic diagram of the explosive structure of this utility model.

Please refer to FIGS. 1 to 3, the utility model provides a three way valve, which includes a three way valve body 7, and the three way valve body 7 is a cylinder shape. One end of the cylinder (the upper end of FIG. 1) is the knob end and the other end (the lower end in FIG. 1) is the end of the spray seat. On the side wall of the cylinder, the first joint 7-1 and the third joint 7-3 are respectively arranged on the opposite sides, and second joint 7-2 are arranged between the first joint 7-1 and the third joint 7-3.The second joint 7-2 and the first joint 7-1 and the third joint 7-3 are separated by 90 degrees, respectively.

The middle part of the three valve body 7 is provided with a partition 7-5, and the third joint 7-3 is provided with a water channel 7-4, which is connected to the inner cavity of the three way valve body 7 and the upper part of the partition 7-5. The partition 7-5 is provided with two water outlets, namely the first water outlet I and the second water outlet II, which are respectively connected to the first joint and the second joint respectively. They are in a non-center position respectively.

A rotor 4 is arranged above the partition 7-5 of the three way valve body 7, the rotor 4 is hollow, the outer wall is surrounded by a circumference water passage groove 4-3, and the water passage hole 4-4 is provided at the water passage groove 4-3 to connect the inner and outer walls. The bottom eccentric position of the rotor 4 is provided with a leather bowl installation column 4-1, the leather bowl installation column 4-1 is provided with a leather bowl spring 5 and the sealing leather bowl 6. When the rotor rotates, the sealing leather bowl 6 can sequentially seal the first water outlet I and the second water outlet II.

The upper end of the rotor 4 is fixed with the fixing seat 2, and the two form a synchronous movement relationship. Refer to FIG. 2, the fixing mode is that the upper side of the rotor 4 is provided with a convex block 4-2, and the fixing seat 2 is provided with a fixing portion 2-1 at the center thereof. A middle portion of the fixing portion 2-1 is provided with a cavity, a top portion of the fixing portion 2-1 is provided with an opening, the convex block 4-2 is fixedly inserted into the opening. In other embodiments, other fixed modes can also be adopted.

the fixing seat 2 is sleeved with a knob 1, and a synchronous movement relationship is formed between the two. In this embodiment, the two are fixed by means of a snap. In other embodiment, the fixing way between the two can also be used in other existing ways, rather than the emphasis of this utility model.

The third joint is externally connected to the threaded joint 9, and the threaded joint 9 is connected to the hexagon nut 8; the lower end of the three way valve body 7 is connected with the spray seat 15.

This utility model is used as follows.

Refer to FIG. 4, in the initial state, the sealing leather bowl 6 seals the water outlet II on the end face of the three way valve body 7, and the water flows from the water inlet end (the third joint 7-3) into the rotor 4, after passing through the water outlet I on the three way valve body 7, water is discharged at the water outlet end (the second joint 7-2), and at this time, the other water outlet end (the first joint 7-1) is closed to realize the function one.

Refer to FIG. 5, in the initial state, by switching the knob 1, and driving the rotor 4 and the sealing leather bowl 6 to rotate 90 degrees, the water outlet I and the water outlet II on the end face of the three way valve body 7 are in the open state;The water flows into the rotor 4 from the inlet end, after passing through the water outlet I and the water outlet II on the three way valve body 7, water is simultaneously discharged at the two water outlet ends to realize the function two.

Refer to FIG. 6, in the initial state, by switching the knob 1, and driving the rotor 4 and the sealing leather bowl 6 to rotate 180 degrees, the sealing leather bowl 6 seals the water outlet I on the end of the three way valve body 7, and the water flows from the water inlet to the rotor 4 and passes through the water outlet II of the three way valve body 7, at this time, the water outlet of the first joint 7-1 is discharged water, and the other water outlet is closed to realize the function three.

The above mentioned is only a better embodiment of the utility model. Therefore, the scope of the utility model can not be limited, that is, the equivalent changes and modifications made according to the scope and contents of the patent of the utility model shall still belong to the scope covered by this utility model.

The invention claimed is:

1. A three way valve, comprising:
  a three way valve body, wherein:
    the three way valve body is disposed with a water inlet channel,
    a partition is disposed in a center of the three valve body,
    two water outlets are disposed on the partition,
    the two water outlets are respectively connected to two water outlet channels,
    a rotor is disposed above the partition,
    an eccentric position of a bottom of the rotor is disposed with
    a sealing bowl,
    the rotor is hollow,
    an outer wall of the rotor is circumferentially disposed with a water passage groove,
    the water passage groove is disposed with a water passage hole passing through an
    inner wall of the rotor and the outer wall of the rotor, and
    when the rotor is rotated, the sealing bowl is sequentially configured to
    seal each of the two water outlets.

2. The three way valve according to claim 1, wherein the two water outlets are respectively disposed in a position away from a center of the partition.

3. The three way valve according to claim 2, wherein:
  a first joint and a third joint are disposed on opposite sides of the three way valve body, and
  a second joint is disposed between the first joint and the third joint.

4. The three way valve according to claim 1, wherein the rotor is disposed with a mounting.

5. The three way valve according to claim 4, wherein the mounting seat is surrounded by a knob.

6. The three way valve according to claim 5, wherein:
  a first joint and a third joint are disposed on opposite sides of the three way valve body, and
  a second joint is disposed between the first joint and the third joint.

7. The three way valve according to claim 4, wherein:
  a first joint and a third joint are disposed on opposite sides of the three way valve body, and
  a second joint is disposed between the first joint and the third joint.

8. The three way valve according to claim 1, wherein:
  the eccentric position of the bottom of the rotor is disposed with a mounting hole for mounting the sealing bowl, and
  the mounting hole is disposed with a bowl spring.

9. The three way valve according to any of claim 8, wherein:
  a first joint and a third joint are disposed on the opposite sides of the three way valve body, and
  a second joint is disposed between the first joint and the third joint.

10. The three way valve according to claim 1, wherein:
  a first joint and a third joint are disposed on opposite sides of the three way valve body, and
  a second joint is disposed between the first joint and the third joint.

* * * * *